(12) United States Patent
Redmann et al.

(10) Patent No.: US 12,330,518 B2
(45) Date of Patent: **\*Jun. 17, 2025**

(54) METHOD AND APPARATUS FOR PARKING LOT METERING

(71) Applicant: Liberty PlugIns, Inc., Santa Barbara, CA (US)

(72) Inventors: William Gibbens Redmann, Glendale, CA (US); Chris Outwater, Santa Barbara, CA (US)

(73) Assignee: Liberty PlugIns, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,644

(22) Filed: Dec. 19, 2023

(65) Prior Publication Data

US 2024/0116376 A1 Apr. 11, 2024

Related U.S. Application Data

(63) Continuation of application No. 18/048,217, filed on Oct. 20, 2022, now Pat. No. 11,878,598, which is a
(Continued)

(51) Int. Cl.
*B60L 53/14* (2019.01)
*B60L 1/02* (2006.01)
(Continued)

(52) U.S. Cl.
CPC ............ *B60L 53/14* (2019.02); *B60L 1/02* (2013.01); *B60L 53/305* (2019.02); *B60L 53/64* (2019.02);
(Continued)

(58) Field of Classification Search
CPC ........ B60L 53/14; B60L 53/64; B60L 53/305; B60L 53/665; B60L 53/65; B60L 1/02;
(Continued)

(56) References Cited

U.S. PATENT DOCUMENTS 10,395,536 B2 * 8/2019 Redmann .............. B60L 53/665
11,479,133 B2 * 10/2022 Redmann ................ G07F 9/002
(Continued)

OTHER PUBLICATIONS

Reinhold, R., "Los Angeles Aids in Plan for Electric Car," Journal Record, Oklahoma City, Oklahoma, Bridge Tower Media Holding Company, Sep. 25, 1991.*

*Primary Examiner* — Nathan Erb
(74) *Attorney, Agent, or Firm* — Kasha Law LLC; John R. Kasha; Kelly L. Kasha (57) ABSTRACT

A method and apparatus for parking lot metering. The present invention allows multi-space meters to separately manage and control premium parking spaces, such as those for charging electric vehicles or those which supply electric power for engine block heaters in both pay-by-space and pay-an-display systems. Such premium spaces can be managed together over large areas (e.g., a city or region), or may be managed over smaller areas (e.g., the domain of an individual kiosk), or individually per parking space. Management includes pricing, time limits, hours, seasons of operation, and restrictions by vehicle type, and alternative pricing and restrictions for non-premium hours.

18 Claims, 8 Drawing Sheets

Related U.S. Application Data continuation of application No. 16/548,022, filed on Aug. 22, 2019, now Pat. No. 11,479,133, which is a continuation of application No. 15/055,565, filed on Feb. 27, 2016, now Pat. No. 10,395,536, which is a continuation of application No. 14/324,209, filed on Jul. 6, 2014, now abandoned, which is a continuation of application No. 12/659,376, filed on Mar. 5, 2010, now Pat. No. 8,812,353.

(60) Provisional application No. 61/252,909, filed on Oct. 19, 2009.

(51) Int. Cl.
| | |
|---|---|
| *B60L 53/30* | (2019.01) |
| *B60L 53/64* | (2019.01) |
| *B60L 53/65* | (2019.01) |
| *B60L 53/66* | (2019.01) |
| *G06Q 20/12* | (2012.01) |
| *G06Q 20/14* | (2012.01) |
| *G07B 15/02* | (2011.01) |
| *G07C 1/30* | (2006.01) |
| *G07F 9/00* | (2006.01) |
| *G07F 17/24* | (2006.01) |
| *G08G 1/14* | (2006.01) |

(52) U.S. Cl.
CPC .............. *B60L 53/65* (2019.02); *B60L 53/665* (2019.02); *G06Q 20/127* (2013.01); *G06Q 20/14* (2013.01); *G07B 15/02* (2013.01); *G07C 1/30* (2013.01); *G07F 9/001* (2020.05); *G07F 9/002* (2020.05); *G07F 17/24* (2013.01); *G08G 1/14* (2013.01); *G08G 1/145* (2013.01); *G08G 1/148* (2013.01); *B60L 2240/445* (2013.01); *B60L 2240/80* (2013.01); *B60L 2250/10* (2013.01); *B60L 2250/12* (2013.01); *B60L 2250/14* (2013.01); *B60L 2250/20* (2013.01); *B60L 2260/58* (2013.01); *B60L 2270/12* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC ........... B60L 2240/445; B60L 2240/80; B60L 2250/10; B60L 2250/12; B60L 2250/14; B60L 2250/20; B60L 2260/58; B60L 2270/12; G07F 9/001; G07F 9/002; G07F 17/24; G06Q 20/127; G06Q 20/14; G07B 15/02; G07C 1/30; G08G 1/14; G08G 1/145; G08G 1/148; Y02T 10/70; Y02T 10/7072; Y02T 90/12; Y02T 90/14; Y02T 90/16; Y02T 90/167; Y04S 30/14
See application file for complete search history.

(56) References Cited

U.S. PATENT DOCUMENTS

| | | | | |
|---|---|---|---|---|
| 11,878,598 | B2* | 1/2024 | Redmann | ................. G08G 1/14 |
| 2003/0146852 | A1* | 8/2003 | O'Dell | .................. G07B 15/02 |
| | | | | 340/5.2 |
| 2008/0319837 | A1* | 12/2008 | Mitschele | ............. G07F 17/246 |
| | | | | 705/13 |
| 2010/0161393 | A1* | 6/2010 | Littrell | .................. G06Q 50/06 |
| | | | | 705/16 |
| 2010/0225475 | A1* | 9/2010 | Karch | .................. B60L 53/305 |
| | | | | 340/5.6 |

* cited by examiner

Active Passes 810

| Space ID | Expires |
|---|---|
| 01 | 05:35 PM |
| 05 | 10:23 AM |
| 06 | 09:45 AM |

811, 812

Spaces 820

| Space ID | Kind |
|---|---|
| 01 | E |
| 02 | O |
| 03 | O |
| 04 | O |
| 05 | E |
| 06 | EE |

Active Passes 910

| Kind ID | Expires |
|---|---|
| E | 05:35 PM |
| O | 10:23 AM |
| EE | 09:45 AM |

911, 812

Spaces 920

| Kind ID | Count |
|---|---|
| O | 3 |
| E | 2 |
| EE | 1 |
| H | 0 |

|  1400 |||
|---|---|---|
| Space | Kind | Expiry |
| 01 | E | 05:35 PM |
| 02 | - | |
| 03 | O | 10:24 AM |
| 04 | - | |
| 05 | - | |
| 06 | EE | 09:45 AM |

Figure 14

| 1500 ||
|---|---|
| Expiry | Kind |
| 09:45 AM | EE |
| 10:24 AM | O |
| 05:35 PM | E |

Figure 15

METHOD AND APPARATUS FOR PARKING LOT METERING

CROSS-REFERENCE TO RELATED APPLICATION

This application is a continuation of U.S. patent application Ser. No. 18/048,217, filed Oct. 20, 2022, which is a continuation of U.S. patent application Ser. No. 16/548,022, filed Aug. 22, 2019, now U.S. Pat. No. 11,479,133, which is a continuation of U.S. patent application Ser. No. 15/055,565, filed Feb. 26, 2016, now U.S. Pat. No. 10,395,536, which is a continuation of U.S. patent application Ser. No. 14/324,209, filed Jul. 6, 2014, now abandoned, which is a continuation of U.S. patent application Ser. No. 12/659,376, filed Mar. 5, 2010, now U.S. Pat. No. 8,812,353, which claims the benefit of U.S. Provisional Application Ser. No. 61/252,909, filed on Oct. 19, 2009. All of the above mentioned applications are incorporated by reference herein in their entireties.

BACKGROUND

Field of the Invention

The present invention relates generally to a system and method for parking meters. More specifically, the present invention relates to a system and method for a multi-space parking meter that differentiates between ordinary parking spaces and premium parking spaces, for example at which electric vehicles may charge.

Description of the Prior Art

There are a growing number of plug-in electric vehicles (PEVs) and plug-in hybrid vehicles (PHEVs) on the roads of the world. For the sake of this discussion we refer to all of these vehicles simply as electric vehicles, or EVs. This growing population of EVs will require a rich charging environment, allowing them to plug in and charge under various conditions and times and places during the night and day.

Several companies have begun to supply charging site infrastructure for EVs. These companies are providing their own infrastructure for metering, timing, and billing their customers. These companies often revenue share with city government or private parking lot owners.

EV charging is intrinsically tied to parking: other than hybrid-electric vehicles, EVs must be parked to be charged, and even PHEVs exhibit better economy and a lower carbon footprint when charged from the plug rather than from their fuel-driven generator.

A change occurring in the parking meter industry is being driven by the high cost of infrastructure and the need for more efficient ways to designate, control, and enforce metered parking spaces. This change is a move away from single-space (i.e., one meter per parking space) to multi-space metered parking. "Multi-space" is a general industry term designating as few as one, but often several strategically located payment centers or kiosks, each kiosk serving multiple parking spaces in its proximity, perhaps redundantly.

There are two basic methods currently employed for using a central kiosk-based, multi-space system: one is "pay-by-space" and the other is "pay-and-display".

Pay-by-space parking requires each parking space to have a unique, corresponding number. A customer parks a vehicle in a parking space, notes the number of the parking space, and proceeds immediately to a nearby payment kiosk. At the kiosk, the customer is asked to input the number of the parking space, select an amount of time required, and then pay an appropriate fee, typically using any of several payment methods, including credit card. The customer does not need to return to the vehicle to display a receipt. With pay-by-space, parking enforcement officers can visit the kiosk or otherwise (e.g., though a wireless connection) obtain from the kiosk a list of spaces that should be empty. Vehicles inappropriately occupying a space that should be empty may be ticketed.

Pay-and-display parking does not require parking spaces to be numbered. Instead, a customer parks a vehicle in a parking space and proceeds immediately to a nearby payment kiosk. The customer selects only the amount of time required and pays an appropriate fee, choosing from several payment options as with pay-by-space. The customer is issued a receipt that is date and time stamped and indicates the amount of time purchased. More specifically, the receipt indicates when the amount of time purchased will expire. However, since the kiosk is unaware of which space is being used, the customer must return to the vehicle and leave the receipt on the dashboard so that it is clearly displayed through the windshield. With pay-and-display, parking enforcement officers do not need to visit the kiosk, but instead simply look for and ticket vehicles having either no receipt, or whose receipt has expired.

SUMMARY OF THE INVENTION

The present invention adapts and makes use of existing infrastructure resources rather than to add expensive new infrastructure.

The focus of the present invention to incorporate EV charging and billing into existing parking meter systems with special emphasis on the newer credit card based, central kiosk, multi-space parking technology.

The present invention operates with either multi-space parking method and enables EV charging and billing where applied. The following discussion independently various embodiments of the invention for each parking method.

Pay-by-Space

In this case, the pay-by-space customer would be driving an EV and would be canvassing the parking lot or parking spaces on the street, looking for signage indicating an EV charge enabled parking space. When an open space is found, the customer would park the vehicle and note the unique ID for the space (e.g., the parking space number).

At this point, the customer can plug in a charge cord for charging the EV. This step may be performed later, however if performed at this time, the customer will not have to return to the vehicle following his transaction at the payment kiosk.

The customer would then proceed to the payment center kiosk and input the appropriate space number.

The kiosk, based on its database, would know that that unique number corresponds to an EV charging space.

In one embodiment, the kiosk may notify the customer and confirm that this is an EV charging space. If customer confirms, then the kiosk can display the times and parking fees for that space.

In such an embodiment, the kiosk may restrict issuance of the parking space, if as a matter of policy parking in that space is reserving for EVs, either all of the time, or for certain hours. If the customer indicates that no EV charging will be used, the kiosk cancel the transaction.

In an alternative embodiment, the kiosk does not specifically notify or confirm that this is an EV charging space.

As a matter of policy, there may be a premium attached to parking in the EV space and/or for use of the EV charging unit. Further, such premium may only be for certain hours, e.g., for those hours when EV charging is in greatest demand, or for those hours when charging is available. This will be flexible and programmable within the context of the software of the billing kiosk and central billing network.

There are several options for enabling the charging at the designated site. The simplest is to have the power to the charging outlet turned on at all times, anticipating that an EV will park in the space and plug in.

If parking is restricted to EVs, then one could have a sensor, such as the one taught by Quinn in U.S. patent application Ser. No. 11/501,406, to determine when a vehicle is parked in the space. However, in one embodiment of the present invention, the output of the sensor is used in the present invention to enable charging. Once the vehicle is plugged into the charging outlet, the customer will go to the kiosk and pay to park, or risk the cost of a parking fine. It is up to the owner to decide if the EV parking space is restricted to EVs only, and to ensure that non-EVs and unpaid parking behaviors will be fined.

Another method is to "eavesdrop" or piggyback on the communication from the central kiosk to a central billing center or other entity, noting the space number the EV driver inputted and whether it is an EV charge enabled space and then enabling the EV charging power to flow based on the billing confirmation sent back to the kiosk. In this embodiment, an external communication device is used to sense the communications from the kiosk to the central billing network and use that signal to enable a specific EV space for a chosen period of time based on the successful billing transaction.

In still another embodiment, the kiosk can be adapted to communicate directly with the charging station, to enable the charging outlet only if and while parking in the corresponding space has been paid for.

Pay-and-Display

With the pay-and-display system, the appropriate EV parking spaces would be designated in the marked for EV charging.

The kiosk is programmed to know that some spaces within its area are EV enabled, but does not know if the customer chose one of those spaces. The kiosk must query the customer as an initial step in the transaction: Is your space EV enabled? If the response from the customer is "Yes", then the kiosk shows the appropriate time and fee schedule for an EV charging space, otherwise the non-EV schedule is shown.

After the customer has completed the payment transaction, a receipt is printed and provided that the customer must display in the vehicle's window. If parked in an EV space, the receipt must have a mark or code designating payment for an EV enabled space. Perhaps it might be as simple as a large "EV" printed at the top or bottom.

In this embodiment the EV charging would always be enabled and does not require any activation from the kiosk.

The pay-and-display is the simplest way to introduce EV charging into an existing multi-space parking meter system and allow for incremental billing for charging of an EV, if desired.

Once the EV charge space is located, the charge plug is added and the proper signage displayed. The software in the kiosk adapted to ask the customer if their space is EV enabled. If no, then proceed as usual for any space. If yes, then show a different fee schedule for time in the space. If confirmed by customer, then transaction may occur. Once confirmed, a special EV designated receipt can be printed out for the customer to display in their vehicle.

Pay and display can also take the form where a driver drives up to a kiosk for a parking structure, takes a ticket and proceeds to choose a parking space. In this case, the driver can indicate that he is driving an EV and plan to park in an EV spot by pressing a button or giving some other indication to the system. A ticket is issued that is different than a non-EV ticket (it could have a logo or be a different color). Any difference is within the scope of the present invention. The driver can then legally park in an EV space and charge, paying either an attendant upon exiting or a machine prior to exit.

A drawback that inhibits wide adoption of electric vehicles is the lack of infrastructure for conveniently charging them; and while hybrid electric vehicles are increasingly popular, plug-in versions that operate to maximize use of their battery and minimize use of their gasoline-fueled generator are rare, in part due to the same lack of infrastructure.

Provision of a vehicle charging infrastructure is inhibited primarily by cost: Such infrastructure has been expensive, typically requiring allocation of a physical location that vehicles can access and providing new electric service to that location.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention. The scope of the present invention is not limited to what is shown in the figures.

DESCRIPTION OF THE INVENTION

Figure 1:
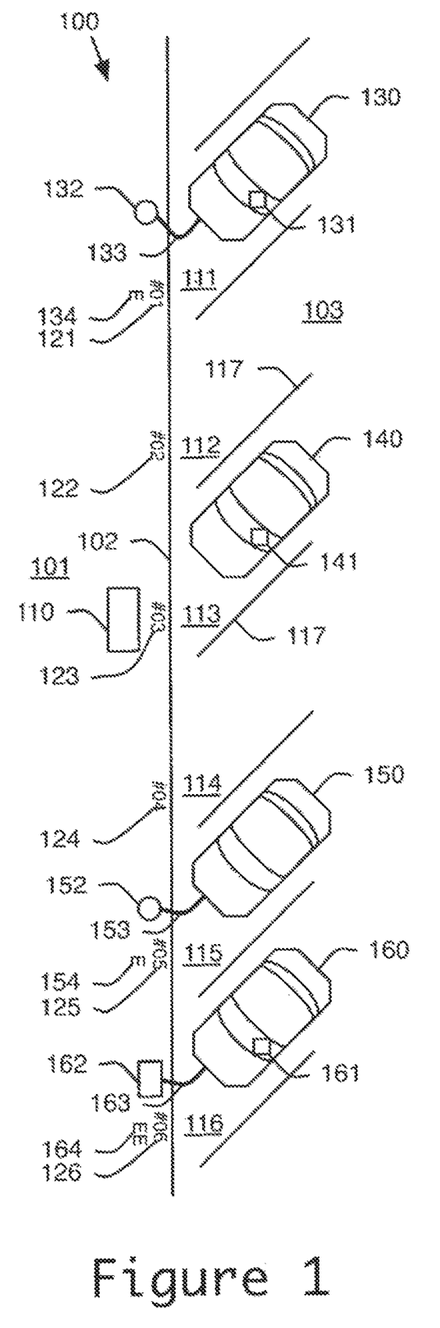
FIG. 1 is a plan view of a parking area under management of the present invention.

Referring to FIG. 1, sidewalk 101 is separated from street 103 by curb 102. Parking area 100 comprises parking spaces 111-116. The parking spaces are divided from each other by lines 107 painted in the street. Payment terminal 110, located on sidewalk 101 in proximity to parking spaces 111-116, manages parking area 100 either alone or in conjunction with other terminals or remote systems (not shown).

Currently, four of parking spaces 111-116 are occupied: space 111 is occupied by vehicle 130, space 113 is occupied by vehicle 140, space 115 is occupied by 150, and space 116 is occupied by vehicle 160.

Depending on the mode of operation, a vehicle may display a parking pass provided by payment terminal 110 on its dashboard. In FIG. 1, three of the four vehicles are displaying a parking pass: vehicle 130 is displaying parking pass 131, vehicle 140 is displaying parking pass 141, vehicle 160 is displaying parking pass 161. Vehicle 150 is not displaying a parking pass.

Also depending on the mode of operation, each parking space 111-116 may be uniquely identified. In FIG. 1, each parking space 111-116 bears corresponding unique identification indicia 121-126. For example, space 112 bears the number "#02" as shown by indicia 122.

Some spaces have particular properties. For example, spaces 111 and 115 are adjacent to streetlights 132 and 152 respectively, each having outlets for charging electric vehicles. In this example, these outlets are Level 1 charging outlets, providing about 1,500 W of electrical power, which can charge a typical electric vehicle in about 8 hours. Space 116 is adjacent to a high-capacity charging station 162 for charging electric vehicles. Level 2 chargers, such as station 162, can provide from about 3,000-20,000 W and can charge a typical electrical vehicle in 30 minutes to 4 hours, depending on the particular voltage and current available. While the outlets near spaces 111, 115, and 116 are all suitable for charging electric vehicles, the high charge rate of charging station 162 makes it suitable for a quick charge, and this is a property of space 116 not conferred (in this example) by the outlets on streetlights 132 and 152 to their corresponding spaces 111 and 115.

In FIG. 1, the vehicles parked in spaces 111, 115, and 116 are shown plugged into the corresponding charging outlets on streetlights 132 and 152, and charging station 162 with corresponding cables 133, 153, and 163.

In some modes of operation, spaces 111 and 115 are marked with indicia 134 and 154, respectively, to indicate their property of Level 1 electric vehicle charging. In this example, indicia 134 & 154 is a single letter "E". Similarly, space 116 is marked with indicia 164 to indicate its property of Level 2 electric vehicle charging, which herein is shown as "EE".

Parking spaces may have other properties. For example, and not by way of limitation, a parking space may have an electrical outlet to be used for engine block heating during extremely cold weather, or a parking space may be covered, a premium in hot or stormy weather.

Such properties may be valuable at anytime (e.g., electric vehicle charging), or only in certain conditions (e.g., engine block heater). On a mild spring day there may be no value to an engine block heater or having a covered parking spot.

Parking spaces lacking exceptional properties such as those mentioned have the property of being ordinary. Such spaces may be marked with an indicia (not shown) corresponding to being ordinary spaces.

Figure 2:
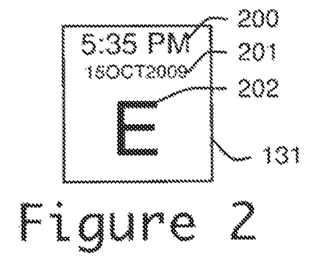
FIG. 2 is a ticket for electric vehicle parking.

FIG. 2 shows a pass 131 provided by kiosk 110 and displayed in vehicle 130, showing the time of expiration 200, the date of issue 201, and an indicia 202 corresponding to the kind of space 111, an "E" for Level 1 electric vehicle charging.

Figure 3:
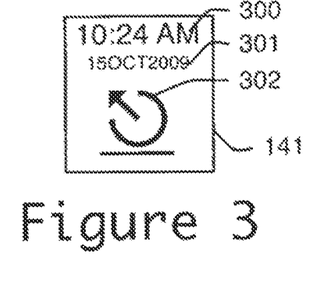
FIG. 3 is a ticket for ordinary vehicle parking.

FIG. 3 shows a pass 141 provided by kiosk 110 and displayed in vehicle 140, showing the time of expiration 300, the date of issue 301, and since space 113 is an ordinary parking space, instead of an indicia corresponding to kind, a clock face 302 shows a graphical version of the time of expiration 300.

In an alternative embodiment, all passes could show a clock face such as 302 to illustrate expiration time.

Figure 4:
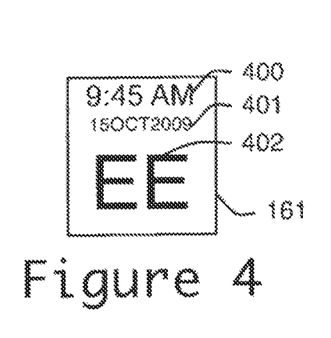
FIG. 4 is a ticket for rapid-charge electric vehicle parking.

FIG. 4 shows a pass 161 provided by kiosk 110 and displayed in vehicle 160, showing the time of expiration 400, the date of issue 401, and an indicia 402 corresponding to the kind of space 116, an "EE" for Level 2 electric vehicle charging.

Figure 5:
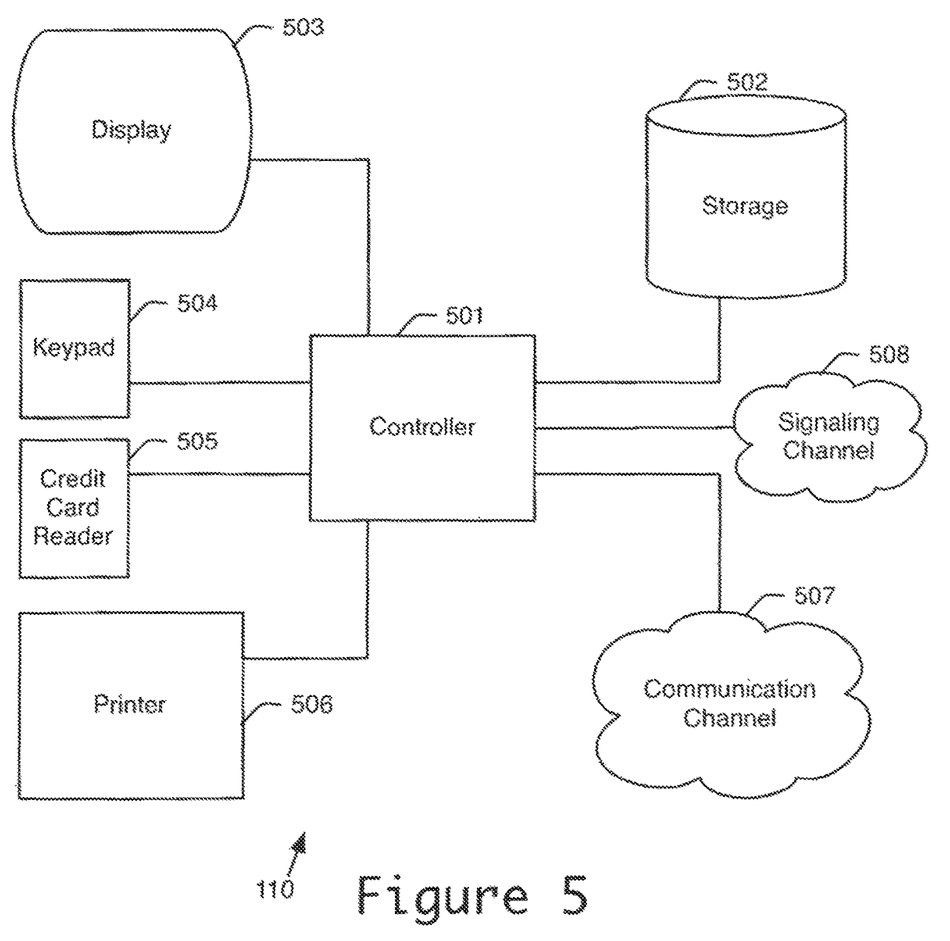
FIG. 5 is a block diagram for a parking kiosk of the present invention.

FIG. 5 is a block diagram suitable for implementing the payment station kiosk 110. A controller 501 has access to storage 502, a display 503 or other user output device, keypad 504 or other user input device, a credit card reader 505 or other payment acceptance device (e.g., an RFID reader, coin or bill acceptor, etc.), a printer 506 for printing parking passes and/or receipts.

In some embodiments, controller 501 may have communication through a channel 507, for example to allow remote management (e.g., allowing an administrator to monitor the operations of terminal 110 or to modify data in storage 502), access to remote data tables (e.g., to update tables kept locally in storage 502, or to upload a snapshot of current status), or to allow remote reporting (e.g., to a terminal belonging to a parking enforcement officer), or allow remote payment (e.g., to a service accessed from a motorist's cell phone).

Figure 6:
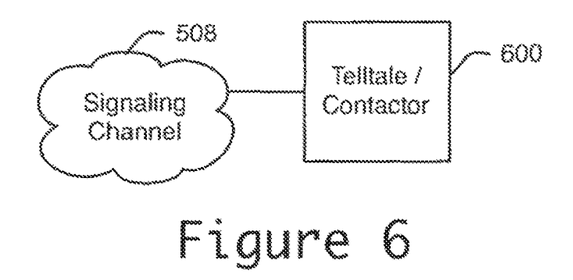
FIG. 6 is a block diagram for a parking violation indicator and/or electric power source contactor to be controlled by the present invention.

In some embodiments, controller 501 may have communication through signaling channel 508 to remotely controlled devices 600. For example, signally channel 508 may be used to set or clear a telltale or semaphore (none shown in FIG. 1) to signal a parking violation at any parking space by indicating whether or not parking is currently paid for the space; or to enable or disable a contactor (none shown in FIG. 1) to supply power for electric vehicle recharging so that power is only available while the parking space has been paid for. FIG. 6 shows a block diagram of such a telltale or contactor circuit, where communication from signaling channel 508 can set/enable or clear/disable a telltale/contactor 600.

Figure 7:
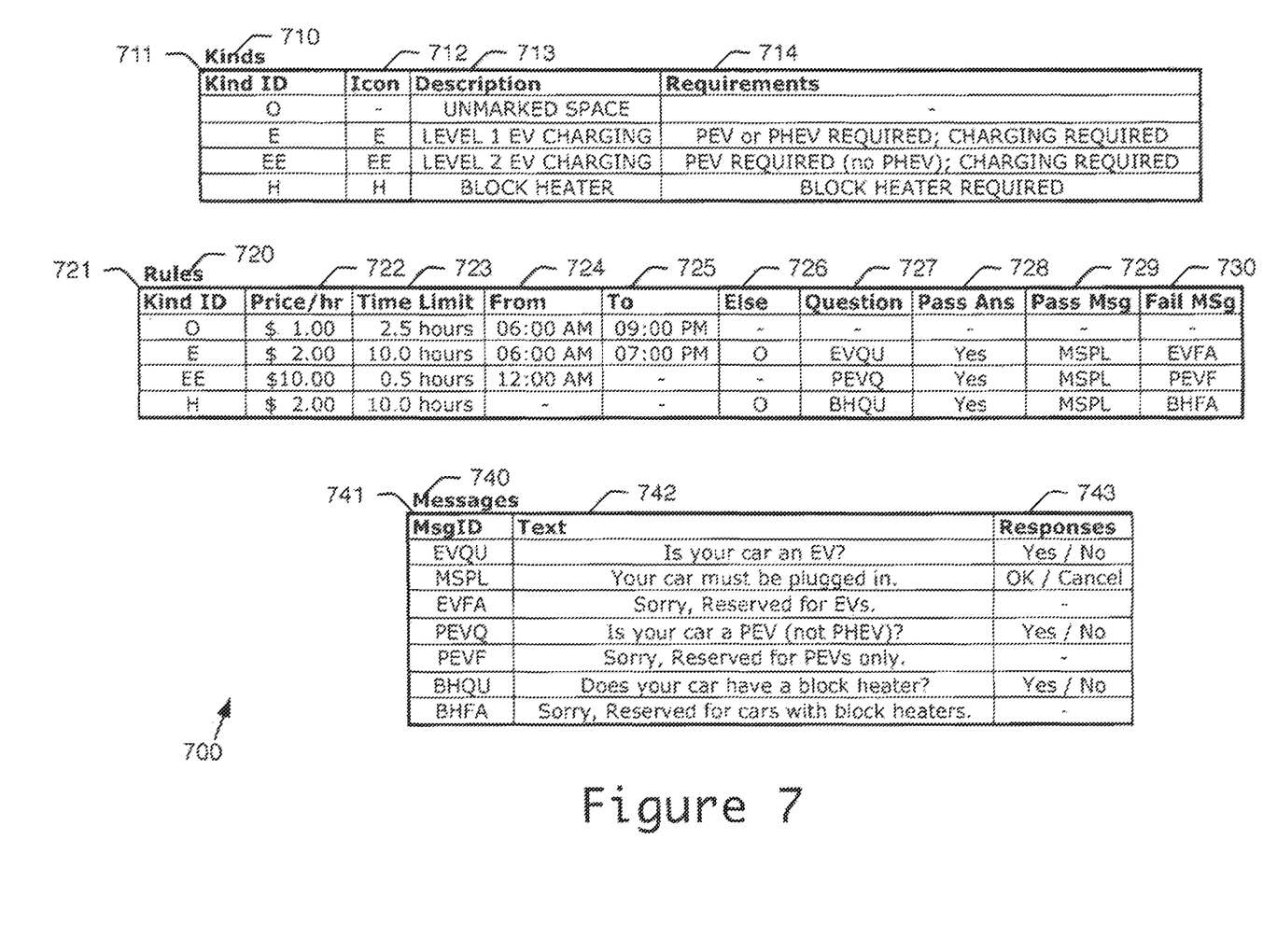
FIG. 7 is an exemplary database of parking kinds and management rules suitable for many parking areas such as shown in FIG. 1.

FIG. 7 shows an example embodiment of management information 700, for holding descriptions and management policies for various kinds of parking spaces. Management information 700 comprises table of kinds 710, table of rules 720, and table of messages 740.

The Kinds table 710 enumerates each parking space kind known to the system, each distinct kind being listed in a separate row. Kind ID column 711 lists four kinds of parking spaces, "O" for ordinary parking spaces, "E" and "EE" as previously described for electric vehicle charging spaces, and "H" for engine block heater ready spaces. Icon column 712 lists the indicia for each kind, with the ordinary parking space kind having no icon, as indicated by the "-" in Icon column 712. In Description column 713, a brief description of each kind of space is provided. In Requirements column 714 the requirements for using each kind of space is listed. The contents of Kinds table 710 are set as a matter of policy by the administrator of the parking area 100.

Rules table 720 provides a convenient way to express policies to govern transactions concerning parking spaces of various kinds. One row in Rules table 720 should be provided for each kind listed in Kinds table 710, with the correspondence being denoted by the Kind ID column 721. Price-per-Hour column 722 lists the price charged for each hour of parking in a space of a particular kind, while Time Limit column 723 lists the maximum allowed time. The hours during which the prices and time limits are enforced are listed in From column 724 and To column 725. For example, ordinary parking spaces, kind ID "0", are billed at $1.00 per hour, with a time limit of 2½ hours, from 6 AM to 9 PM. However, Level 2 EV Charging parking spaces, kind ID "EE", are billed at $10.00 per hour, with a time limit of just ½ hour, 24 hours a day (because the From column starts at midnight, but the To column has no end time specified). Block heater spaces, kind ID "H", are not presently available, as indicated by the To column having no start time specified, however during cold weather, the To column might be set to a different value. In the cases of kinds "E" and "H", Else column 726 indicates an alternative kind to be used. Thus, during the summer when block heater spaces (kind "H") are treated as ordinary spaces. Similarly, around 7 PM, "E" spaces are treated as ordinary spaces, for instance, because the power tapped from streetlights for charging vehicles, as in spaces 111 and 115, may not be available in the evening, or may be reduced, when the streetlights are lit.

The remaining columns 727-730 of Rules table 720 are used to associate questions, answers, and messages useful to clarify and explain restrictions and requirements for particular kinds of parking spaces. In each of Question, Pass Msg, and Fail Msg columns 727, 729, and 730 is a message ID corresponding to an entry in Messages table 740 in the Msg ID column 741. The text of each message is recorded in Text column 742. Pass Ans column 728 notes which of the two entries means consent in Response column 743 for the corresponding Msg ID for Question column 727. For messages not requiring a response, column 743 contains a null entry ("-").

In another embodiment (not shown), Messages table 740 could have each entry in Description, Requirements, Text and Responses columns 713, 714, 742, and 743 in various languages, to be simultaneously, or to be selected by the user during the transaction.

Management information 700 may be kept locally in payment terminal 110, but may be regularly downloaded from a remote server (not shown) or updated by a remote administrator (not shown) through communication channel 507.

Figure 8:
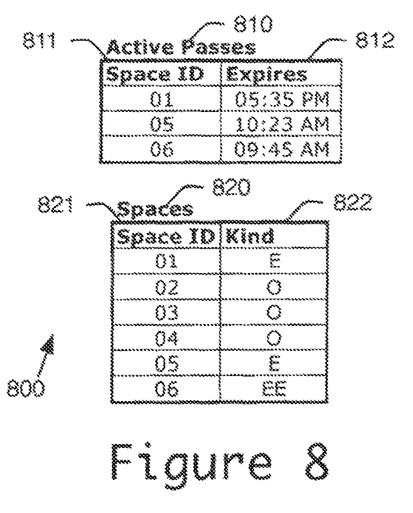
FIG. 8 is an exemplary database for managing the parking area of FIG. 1 using individually numbered parking spaces.

FIG. 8 shows status data 800 for use with a parking area in which parking spaces are uniquely identified. Status data 800 comprises Spaces table 720, which enumerates each of the parking spaces in parking area 100. For each space 111-116, the unique identifier 121-126 is recorded in Space ID column 821. Associated with each space record in Spaces table 821 is the kind of the space, recorded in Kind column 822. In this way, the system 110 can know that space #04 (114) is an ordinary space and should be managed according to the entry in Rules table 721 for ordinary spaces, etc.

Status data 800 further comprises Active Passes table 810, which contains a list of passes that have been issued but have not yet expired. For each active pass, the space identifier is recorded in Space ID column 811 and the time of expiration is recorded in Expires column 812. For example, FIG. 8 shows there is an active pass for space #05 (115) which expires at 10:23 AM.

Figure 9:
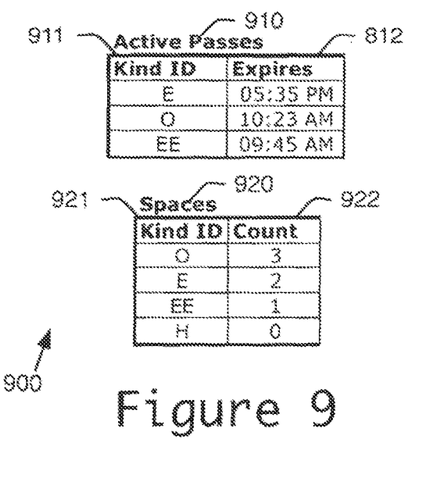
FIG. 9 is an exemplary database for managing the parking area of FIG. 1 without individually numbered parking spaces.

In another embodiment, for use with a parking area in which parking spaces are not uniquely identified, or the identifiers are not used for parking pass transactions, status data 900 may be used. Status data 900 comprises a Spaces table 920, which enumerates the kinds of spaces available in Kind ID column 921 and the count of how many spaces of that kind are present in parking area 100 in the Count column 922. With such information, system 110 can know how many of what kinds of parking spaces should be available.

Status data 900 further comprises Active Passes table 910, which contains a list of passes that have been issued but have not yet expired. For each active pass, the kind is recorded in Kind ID column 911 and the time of expiration is recorded in Expires column 812.

Note that in Active Passes table 810 or 910, neither Space ID, Kind ID, or Expires columns 811, 812, 911 and 912, nor their combination (within their respective tables 810 and 910), represent a unique key to records in the corresponding table 810 or 910, though uniqueness will be upheld in a tremendous fraction of the time. This is because two transactions could be made, at different times, for the same parking space, in the case of table 810, or for the same kind, in the case of table 910, and for the same expiration time. Such transaction would leave identical entries in corresponding Active Passes table 810 or 910. Correct coding of controller 501 can handle such a situation without issue, or table 810 or 910, depending upon which is used in an implementation, may be augmented with a record ID field (not shown) to differentiate between otherwise identical records, if desired.

Figure 10:
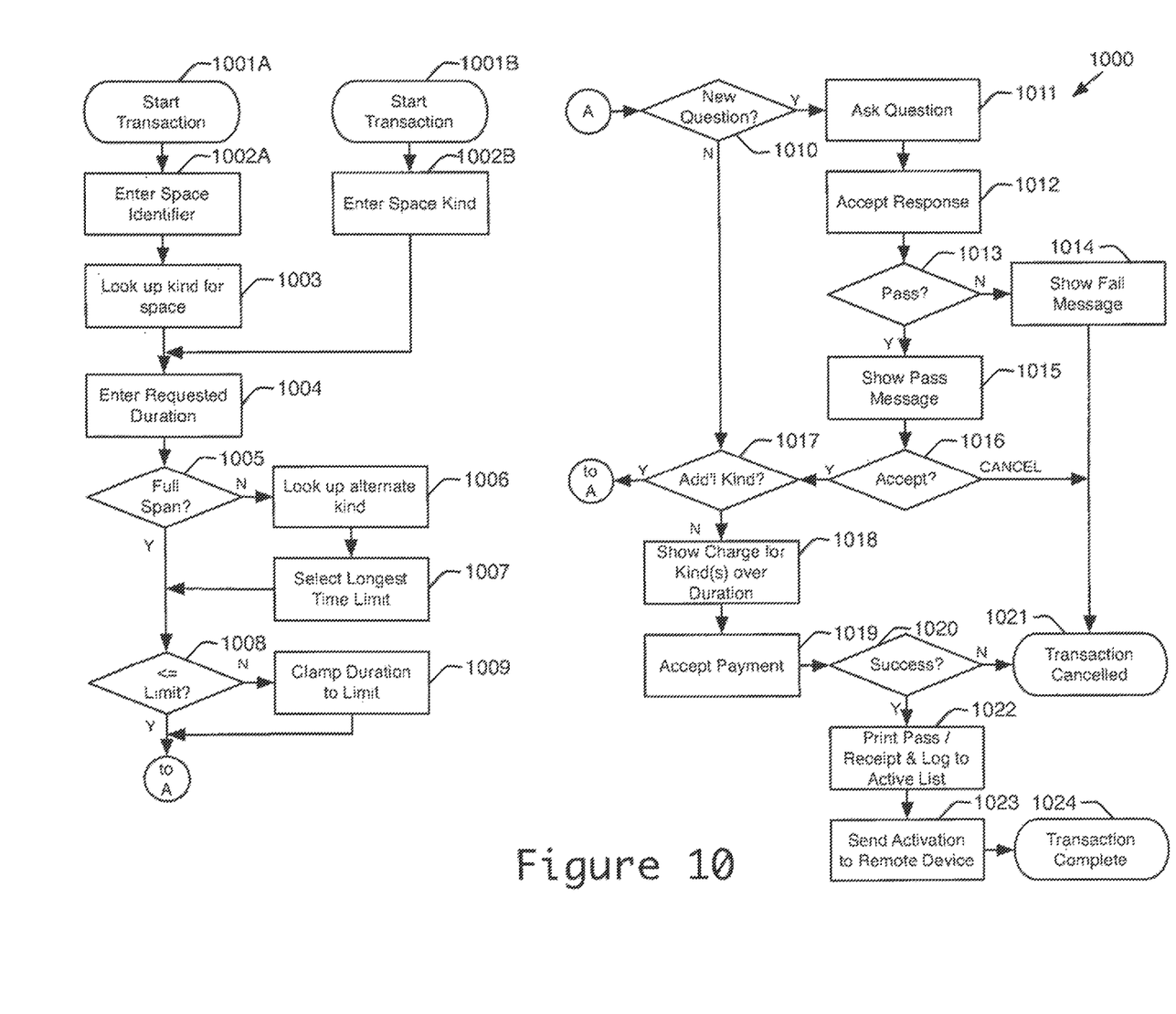
FIG. 10 is a flowchart for a process of issuing a parking ticket with the kiosk of FIG. 5.

Exemplary transaction process 1000 is shown in FIG. 10, for issuing passes such as 131, 141, and 161 for parking spaces 111-116 in parking area 100 and identified in status data 800 or 900, using the kinds and policies represented in management information 700.

For Pay-by-space operations, transaction process 1000 begins at step 1001A, where display 503 or other user interface (e.g., on a cell phone interfacing through a server through communication channel 507, not shown) prompts a motorist to enter a space identifier. In step 1002A, controller 501 accepts the space number provided by the motorist through keypad 504 or other input (e.g., aforementioned cell phone, not shown); and in step 1003 the controller obtains the space's primary kind from Spaces table 820. Processing then continues at step 1004, discussed below.

Figure 11:
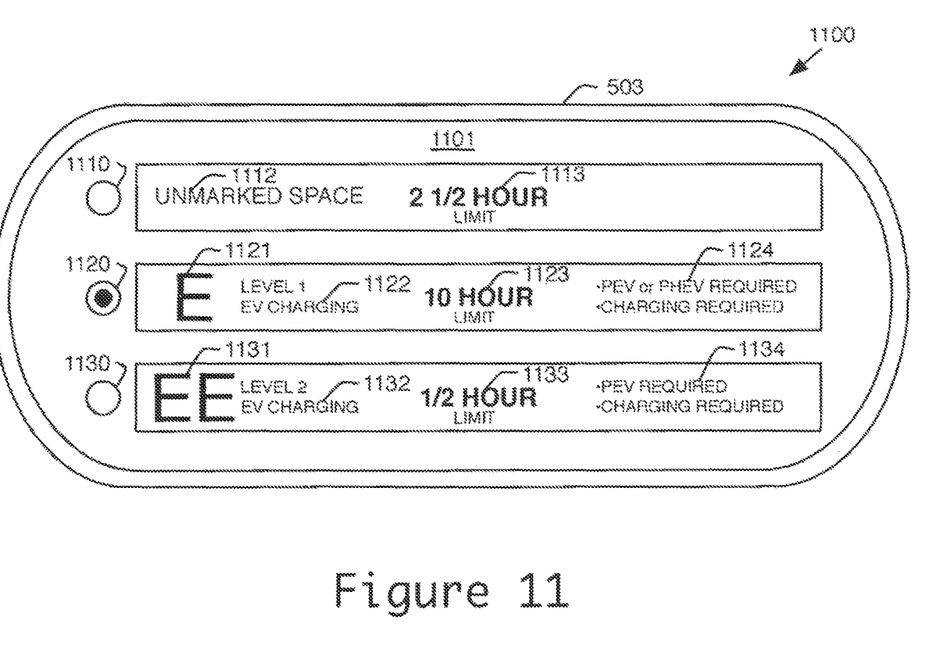
FIG. 11 is a user interface which may be used in the process of FIG. 10 without individually numbered parking spaces.

Alternatively, for Pay-and-Display operations, transaction process 1000 begins with step 1001B, where display 503 or other user interface prompts a motorist for the kind of space, for example as posted by indicia 134, 154, and 164. An example of a suitable user interface 1100 using display 503 is shown in FIG. 11. In this example, Spaces table 920 lists each of the possible kinds, for which user selections 1110, 1120, and 1130 are presented, each labeled with a description of the space type 1112, 1122, and 1132, respectively, retrieved from Description column 713 in Kinds table 710. If an icon is available in the Icon column 712, it too is displayed, as shown by icons 1121 and 1131. Other information may be displayed for each kind, such as time limits 1113, 1123, and 1133 as taken from Time Limit column 723 in Rules table 720, or requirements as taken from Requirements column 714 in Kinds table 710. The motorist may make a selection using keypad 504 (which may include buttons alongside display 503 proximal and corresponding to selections 1110, 1120, and 1130. The motorist's selection of space kind is received in step 1002B and is considered the space's primary kind.

In duration entry step 1004, the system presents a request for the motorists desired duration and the response is accepted.

In step 1005 a test is made to determine whether the current time or the current time plus the duration requested falls outside the operating hours for the primary kind as listed in the From and To columns 724 and 725 of Rules table 720. Effectively, this is a check to see if more than one parking space kind may apply over the requested duration. If not, processing continues at step 1008 using the time limit of the primary kind from Rules table 720, otherwise, a check is made for an alternative kind in step 1006, where Else column 726 may be listed in time limit for the space primary kind as listed in the Time Limit column 723 of Rules table 720. If so, the alternative kind would apply during the hours from now through the duration requested that fall outside the operating hours for the primary kind.

In select longest time limit step 1007, if the alternative kind is in force and the current time plus the requested duration does not exceed the start time (in the From column 724) for the primary kind or the different between the current time and the start time for the primary kind exceeds the time limit of the alternative kind, then the alternative kind time limit is used. Similarly, if the primary kind is in force and the current time plus the requested duration does not exceed the end time (in the To column 725) for the primary kind or the difference between the current time and the end time for the primary kind exceeds the time limit of the primary kind, then the primary kind time limit is used. Otherwise, the larger time limit of the primary kind and the alternative kind is used.

In limit check step 1008, the requested duration is compared to the limit determined at step 1005 or 1007. If the requested duration is less than the time limit, processing continues at step 1010. However, if the requested duration exceeds the time limit, the duration is clamped in step 1009 and a warning is provided to the motorist that the actual parking time limit is and that his parking pass will be limited to that duration.

In questions step 1010, Question column 727 is examined for the first one of the parking kinds that may apply (i.e., the kind and/or the alternative kind, depending on which is currently in force). In step 1010, if an appropriate question not previously asked during this transaction is found, it is asked in step 1011 by taking the message identifier from Question column 727 and finding the corresponding record in Messages table 740 by matching against MsgID column 741 and retrieving from Text column 742 the message that can be displayed for the motorist on display 503 (or other user interface). Also, the corresponding acceptable responses are retrieved from Responses column 743 and displayed, too. In response step 1012, the motorist's selection from the available responses is accepted and compared in step 1013 to the corresponding passing answer form Pass Ans column 728. If the comparison in step 1013 does not match, then in fail step 1014 a fail message identifier is fetched from Fail Msg column 730 and corresponding message and responses are fetched from Messages table 740 and presented, after which the transaction is cancelled in step 1021. However, if the comparison in step 1013 does match, that is the motorist's selected response is the passing response, then in pass step 1015 the implications or restrictions corresponding to the message identifier found in Pass Msg column 729 are fetched from Messages table 740 and presented to the motorist. If, upon presentation of the restriction, the motorist chooses to cancel the transaction, the transaction terminates at step 1021. However, if the motorist accepts, processing continues at step 1017.

In step 1017, a check is made whether another kind also applies (i.e., because the additional kind is in force at the beginning of the duration, but the primary kind will be in effect before the duration expires, or vice versa). If so, processing returns to step 1010. In question step 1010, if no question (or no new question) is identified in Rules table 720, then processing continues to step 1017. In step 1017, if no further kinds can apply to this transaction, then processing continues at charge calculation step 1018.

In step 1018, the charge for the duration is computed as the amount of time spent as the primary kind (if any) times the price for the primary kind taken from Price/hr column 722 in Rule table 720, plus the amount of time spent (if any) as the alternative kind (if any) times the price for the alternative kind. The resulting price is presented to the motorist and in payment step 1019, the motorist pays for parking, for example using a credit card reader 505 to initiate a credit card transaction carried out though communication channel 507, or other supported payment mechanism (e.g., bill & coin acceptor, debit card, RFID, PayPal™ via cell phone, etc.). In outcome step 1020, if the payment transaction failed, the overall transaction is cancelled in step 1021 or in an alternative embodiment, the system can off the option to return to payment step 1019 to try another payment method.

However, if all has gone well and in outcome step 1020 the payment transaction was determined or presumed to have been successful, then in pass generation step 1022, a parking pass such as 131, 141, or 161 apropos to the identified space or space kind and the allowed duration is logged to active passes table 810 or 910 (as appropriate) and, for a Pay-and-Display operation, printed as a parking pass that may be displayed on the dashboard (or other designated location) of the motorist's vehicle or parking space (e.g., a parking pass holder, not shown). Whether or not this is a Pay-and-Display operation, a receipt conveying similar information, including the price paid, may also be printed.

If parking area 100 has remote actuated devices 600, such as those discussed in conjunction with FIG. 6, those corresponding to the identified spaces or kinds of spaces would be activated in step 1023. Note that such devices corresponding to a particular space identifier can be directly controlled, but those corresponding to a kind of space may be less tightly controlled. For example, if the two "E" charging spaces 111 and 115 are both energized through contactors 600 controlled remotely by system 110 and in a Pay-and-Display system a motorist purchases a pass for an "E" space, system 110 may not know which charging outlet is about to be used, and thus the contactors 600 for both must be energized.

Figure 12:
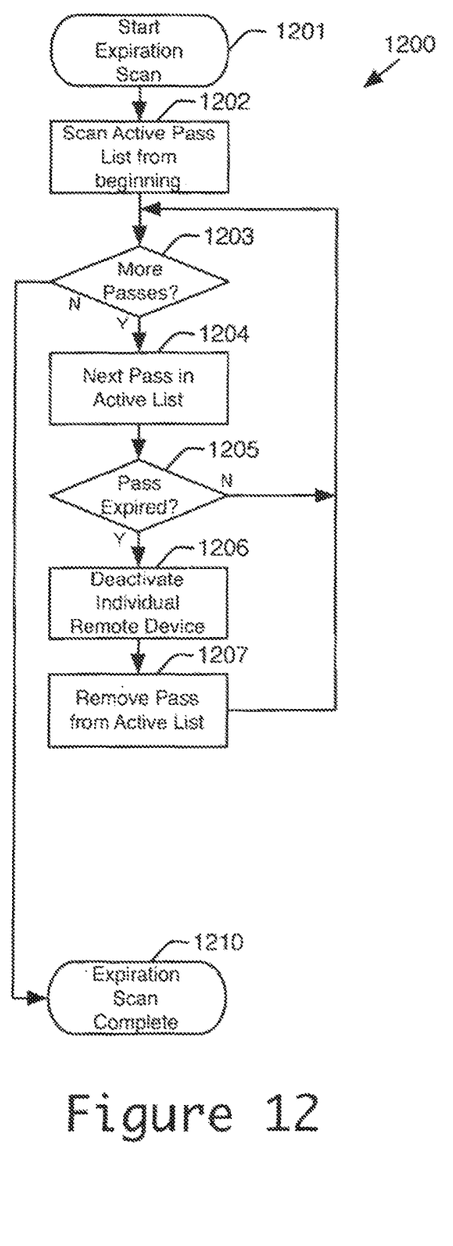
FIG. 12 is a flowchart for ticket expiry for use with individually numbered parking spaces.

Active pass expiration process 1200 is shown in FIG. 12, and is used in conjunction with a Pay-by-Space paradigm, with an expiration scan started in step 1201. Such a scan might be run every minute, or less frequently, for example if pass expiration times are all rounded to the next five-minute increment. In initialization step 1202, an index into Active Passes table 810 is initialized. Step 1203 determines whether there is any further active passes. If not, expiration process 1200 concludes at step 1201, otherwise the indexed is advanced to the next pass in table 810 in step 1204. If the current pass expiration time in Expires column 812 is greater than the current time, the pass is not expired and from test step 1205, the process iterates back to step 1203 to see if there are more passes to be considered. However, if the current pass expiration time is less than or equal to the current time, then the pass is expired and, from test step 1205, the process continues to expired step 1206. In expired step 1206, any remote devices 600 associated with the space ID of the current space is deactivated (e.g., for an electrical vehicle charging outlet contactor), or cleared (e.g., to raise a violation semaphore). Next, in deletion step 1207, the record for the expired pass is removed from Active Passes table 810, and the process iterates to step 1203.

Figure 13:
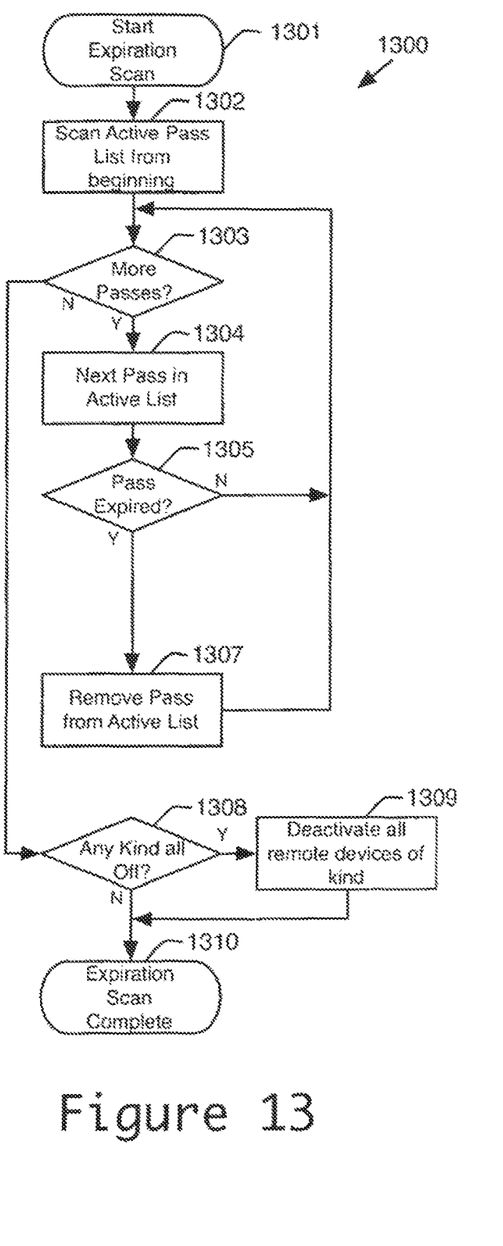
FIG. 13 is a flowchart for ticket expiry for use without numbered parking spaces.

For a Pay-and-Display operation, analogous active pass expiration process 1300 is shown in FIG. 13. However, there are some differences. As in step 1201, an expiration scan is started in step 1301. In initialization step 1302, the index is to Active Passes table 910, and step 1303 determines whether there is any further active passes, continuing if there are to step 1304 wherein the index is advanced to the next active pass. If the pass is not expired, then from test step 1305 the process iterates to step 1303, but if the pass is expired, then it is removed in deletion step 1307 before the process iterates.

If in step 1303 there are no further active passes to be examined, the process continues to kind scan step 1308. In kind scan step 1308, a test is made for each of the kinds in Spaces table 920 having a non-zero count in Count column 922 to determine for which, if any, kinds there are no corresponding active passes of matching kind in Kind ID column 911 of active passes table 910. If there are such kinds not represented by active passes, then in deactivation step 1309, remote devices 600 corresponding to kinds not represented by active passes can be disabled or cleared (e.g., opening electrical contactors for vehicle charging or raising violation semaphores). Otherwise and afterwards, the expiration process 1300 concludes at step 1310.

To facilitate enforcement of parking policies, a report may be provided to parking enforcement officers. This may be through display 503, printer 506, or delivered remotely through communication channel 507, e.g. to a remote terminal, browser, or cell phone via email or other medium, either directly or through a server (no remote delivery shown).

Figure 14:
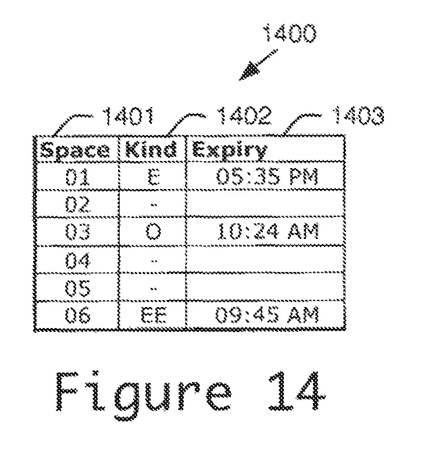
FIG. 14 is a report generated by the present invention for use with individually numbered parking spaces; and, FIG. 15 a report generated by the present invention for use without numbered parking spaces.

FIG. 14 shows a status report 1400 generated by the present invention for use with individually numbered parking spaces. In the case of a Pay-by-Space operation, status report 1400 may comprise a list showing each space in Space column 1401, the kind of space in Kind column 1402, which may be blank if the space is expected to be unoccupied, and the latest expiration time for any active, issued pass for the space in Expiry column 1403. (Note that multiple passes may be active for a space, for instance if a motorist departs before their pass expires and a second motorist purchases a pass for the same spot.)

From status report 1400, parking enforcement can determine that space #05(115) is expected to be empty and that vehicle 150 is therefore illegally parked. Such a report allows parking enforcement to determine which spaces should be empty, which spaces require vehicles to be plugged into charging systems, and which spaces are soon to expire.

In an alternative embodiment, status database 800 could further comprise a table (not shown) of the most recently expired passes for parking spaces that should be empty. Such information could be included in Expiry column 1403 to show how long ago the most recent pass for presumed-empty spaces expired. This would allow enforcement personnel to use report 1400 to prioritize the most egregious offenders, or to implement a "grace period" policy.

Figure 15:
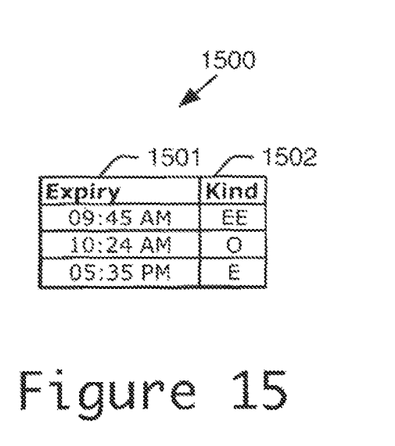

For a Pay-and-Display operation, status report 1500 is shown in FIG. 15. By listing active passes ordered by expiration time in Expiry column 1501, it is easier to cross reference passes 131, 141, 161 that are found displayed in vehicles. Further, the list could be scanned for premium value space kinds, such as "EE" if desired. Other sort orders of active passes may be provided. In another embodiment, recently expired passes may be listed, also with their kind, for example to quickly determine whether a recently expired pass had been assigned to a premium parking space type.

Other embodiments may represent rules for kinds of parking spaces differently, for example, a complex kind might be represented as a list of consecutive times that progress according to a schedule. Further, parking space kinds may have additional properties (not shown) such as only applying on weekdays, or being overridden for two hours, one day per week, for street cleaning. Such extensions to the embodiment presented are within ordinary skill in the art.

Various additional modifications of the described embodiments of the invention specifically illustrated and described herein will be apparent to those skilled in the art, particularly in light of the teachings of this invention. It is intended that the invention cover all modifications and embodiments, which fall within the spirit and scope of the invention. For example, while many of the foregoing embodiments used a relational database paradigm because of its efficient and clear illustrative qualities, those skilled in the art will recognize that other data organizations and other software techniques can be used to achieve the results of the present invention. Thus, while preferred embodiments of the present invention have been disclosed, it will be appreciated that it is not limited thereto but may be otherwise embodied within the scope of the following claims.

What is claimed is:

1. A multi-space parking metering process to support remotely controlling electric vehicle (EV) charging devices located among multiple parking spaces, the process comprising:
    a) automatically receiving, by a controller of a parking management system, for parking in a first parking space managed by the system, the first parking space associated with a EV charging first device, the controller having communication with the first device, the first parking request comprising a first identifier, the first identifier associated with the first device;
    b) based on at least the first parking request, automatically both enabling, by the controller, the first device and recording, by the controller, in a memory of the system having communication with the controller, a first data associated with the first identifier, the first data representative of a first time of expiration;
    c) automatically receiving, by the controller, a second parking request for parking in a second parking space managed by the system, the second parking space associated with no EV charging device, the second parking request comprising a second identifier associated with the second parking space; and,
    d) based on at least the second parking request, automatically recording, by the controller, in the memory, a second data associated with the second parking space, the second data representative of a second time of expiration.

2. The process of claim 1 further comprising:
e) accepting, by the controller, a payment based on at least the first request; and,
wherein b) is further based on the payment.

3. The process of claim 1 further comprising:
e) accepting, by the controller, a payment based on at least the second request; and,
wherein d) is further based on the payment.

4. The process of claim 1 further comprising:
e) displaying, by the controller, with a first user interface with which the controller has communication, a question to a first motorist; and,
f) accepting, by the controller, through the first user interface, an answer from the first motorist in response to the question, said first parking request further comprising the answer.

5. The process of claim 1 further comprising:
e) providing a report to a second device selected from a cell phone, a browser, and a remote terminal, by the controller, the controller having communication with the second device, the report based on the first and second data in the memory, the report comprising one of a list of parking spaces expected to be empty and a list of parking spaces with the expected occupancy of each.

6. The process of claim 1, wherein the second parking space is associated with a corresponding remotely controlled second device selected from an engine warmer and a contactor, the controller having communication to enable the second device, the process further comprising:
f) enabling, by the controller, the second device in response to at least the second parking request.

7. The process of claim 1 wherein the second parking space is associated with a remotely controlled second device selected from a telltale and a violation semaphore, the controller having communication with the second device, the process further comprising:
f) activating, by the controller, the second device in response to the second time of expiration being greater than the current time.

8. The process of claim 1 wherein the enabling is through a power source contactor circuit for supplying power to the first device.

9. The process of claim 1 wherein the enabling is a signal to the first device.

10. The process of claim 1 wherein the first parking request further comprises a duration and the first time of expiration is based on the duration.

11. A multi-space parking meter system for remote control of electric vehicle (EV) charging devices located among multiple parking spaces served by the system, the system comprising:
a controller, the controller to meter and control a plurality of parking spaces, the plurality comprising a first parking space having an EV charging first device and a second parking space having no EV charging device;
a communication channel configured to provide parking requests to the controller;
a signal channel configured to provide communication between the controller and the first device; and,
a memory with which the controller has communication;
wherein the controller is configured to:
a) accept a first parking request comprising at least a first identifier associated with the first device;
b) on the basis of at least the first request both enable, with the signal channel, the first device and record, in the memory, a first data associated with the first device, the first data representative of a first time of expiration;
c) accept a second parking request comprising at least a second identifier associated with the second parking space; and,
d) on the basis of at least the second request, record, in the memory, a second data associated with the second parking space, the second data representative of a second time of expiration.

12. The system of claim 11, wherein the controller is further configured to accept a payment in association with the first request, and b) is on the further basis of the payment.

13. The system of claim 11, wherein the controller is further configured to accept a payment in association with the second request, and d) is on the further basis of the payment.

14. The system of claim 11 wherein the controller is further configured to:
e) display to a motorist, through a user interface with which the controller has communication, a question; and,
f) accept, through the user interface, from the motorist, an answer in response to the question;
wherein the first parking request further comprises the answer.

15. The system of claim 14 wherein the first user interface comprises one of a display of the system and a cell phone of the motorist.

16. The system of claim 11 wherein the controller further provides a report to a second device with which the controller has communication, the second device selected from a cell phone, a browser, and a remote terminal, the report based on the first and second data in the memory, the report comprising one of a list of parking spaces expected to be empty and a list of parking spaces with the expected occupancy of each.

17. The system of claim 11 wherein the second parking space is associated with a corresponding remotely controlled second device selected from an engine warmer and a contactor, the signal channel is further configured to provide communication between the controller and the second device, and the controller is further configured to:
e) on the basis of at least the second request, enable, with the signal channel, the second device.

18. The system of claim 11 wherein the second parking space is associated with a corresponding remotely controlled second device selected from a telltale and a violation semaphore, the signal channel is further configured to provide communication between the controller and the second device, and the controller is further configured to:
e) activate the second device in response to the second time of expiration being greater than the current time.

* * * * *